(12) United States Patent
Whitaker et al.

(10) Patent No.: US 6,958,084 B2
(45) Date of Patent: Oct. 25, 2005

(54) SINTERED COBALT-BASED ALLOYS

(75) Inventors: Iain Robert Whitaker, Coventry (GB); Richard Jameson Pavey, Waupun, WI (US)

(73) Assignee: Federal-Mogul Sintered Products Limited, West Midlands (GB)

( * ) Notice: Subject to any disclaimer, the term of this patent is extended or adjusted under 35 U.S.C. 154(b) by 0 days.

(21) Appl. No.: 10/482,253

(22) PCT Filed: Jun. 25, 2002

(86) PCT No.: PCT/GB02/02911

§ 371 (c)(1),
(2), (4) Date: May 24, 2004

(87) PCT Pub. No.: WO03/004711

PCT Pub. Date: Jan. 16, 2003

(65) Prior Publication Data

US 2004/0237712 A1 Dec. 2, 2004

(30) Foreign Application Priority Data

Jul. 3, 2001 (GB) .............................. 0116203

(51) Int. Cl.$^7$ ................................. B22F 3/00
(52) U.S. Cl. ............... 75/231; 75/246; 419/10; 419/38; 419/58; 419/60
(58) Field of Search .............. 75/231, 246; 419/10, 419/38, 58, 60

(56) References Cited

U.S. PATENT DOCUMENTS 3,461,069 A   8/1969   Graham et al.
3,817,719 A * 6/1974   Schilke et al. ................. 75/231
4,093,454 A * 6/1978   Saito et al. .................... 75/236
4,272,290 A   6/1981   Lesgourgues
5,082,625 A * 1/1992   Kato et al. .................... 420/453

FOREIGN PATENT DOCUMENTS

| FR | 82330 | 12/1963 |
| GB | 1247356 | 9/1971 |
| JP | 060279903 A | 10/1994 |
| JP | 2000017369 A | 1/2000 |

OTHER PUBLICATIONS

WPI Abstract Accession No. 78–23267A/12 and SU 565070 A (AS).

Davis, J.R., "Nickel, Cobalt and Their Alloys", ASM International, pp. 58–61, 362 and 367, USA.

* cited by examiner

Primary Examiner—Ngoclan T. Mai
(74) Attorney, Agent, or Firm—Howard & Howard

(57) ABSTRACT

A sintered material and a method for the production thereof is described. The material comprises an alloy selected from one of the groups having a composition comprising in weight %: either Cr 5–30/Mo 0–15/Ni 0–25/W 0–15/C 0–5/Si 0–5/Fe 0–5/Mn 0–5/others 10 max/Co balance, or Cr 10–20/Mo 0–15/Co 0–20/W 0–5/Fe 0–20/Al 0–5/Ti 0–5/others 15 max/Ni balance; said alloy having incorporated therein from 3–15 weight % of Sn; and optionally from 1–6 weight % of a solid lubricant material.

18 Claims, 1 Drawing Sheet

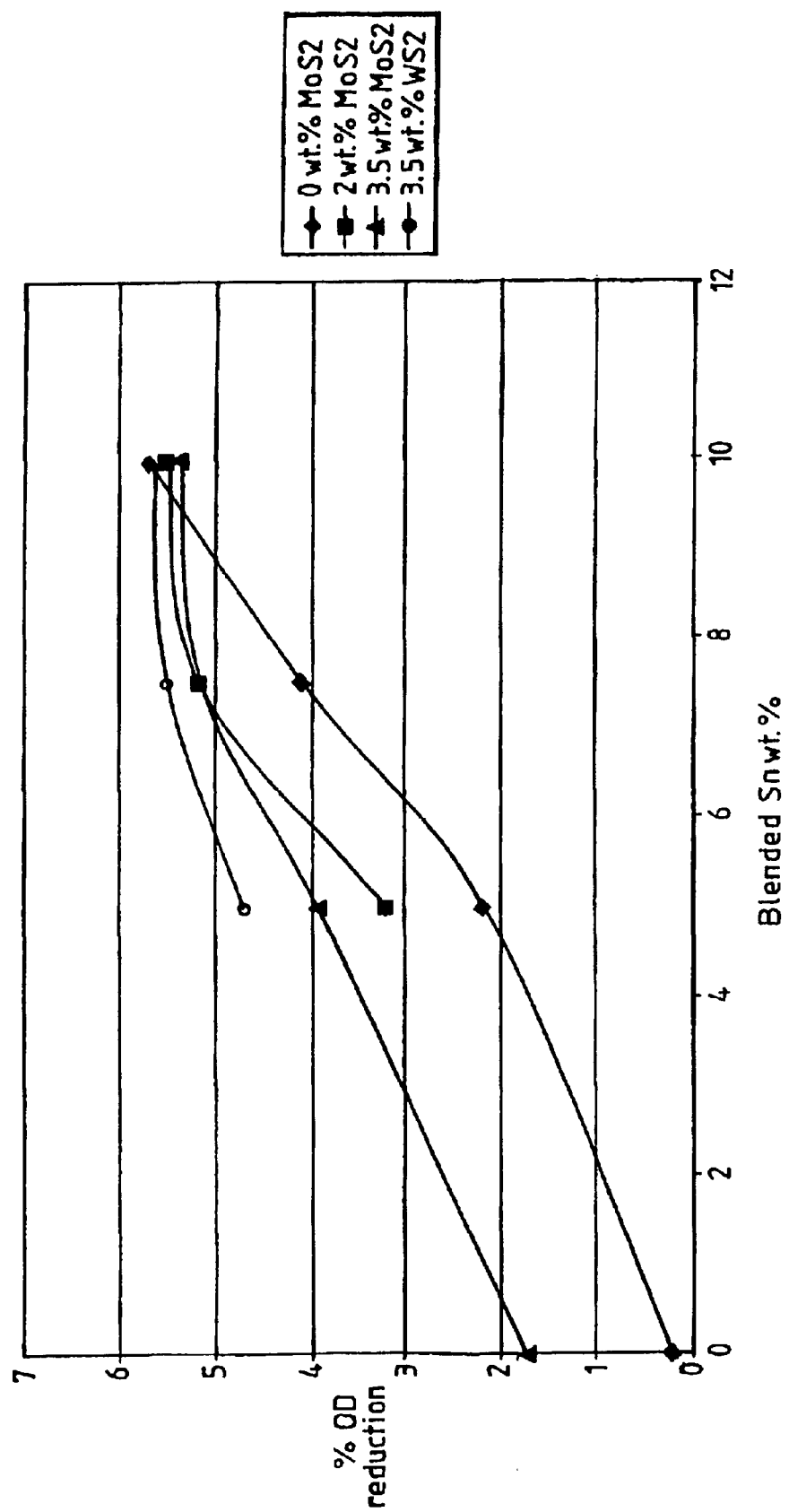

SINTERED COBALT-BASED ALLOYS

BACKGROUND OF THE INVENTION

1. Technical Field

The present invention relates to alloys based on cobalt and/or nickel and a method for the production thereof by a powder metallurgy route.

2. Related Art

Turbochargers for internal combustion engines have been in common use for many years in order to increase the power output and decrease the emissions of an engine. However, one drawback with the use of turbochargers has been the so-called "turbo lag" where the engine speed response to the throttle is delayed owing to the time needed for the exhaust gas turbine to increase speed and hence supply further air by the compressor for combustion. In recent years, however, turbocharger designs have been introduced which have largely overcome or at least greatly reduced the turbo lag problem.

Reduction in turbo lag has generally been achieved in one of two main ways. Firstly, there are designs which have moving vanes in order to alter the approach gas speed and direction on to the exhaust turbine to utilise the exhaust gas flow more efficiently at low turbine speeds and hence enable the compressor impeller wheel to accelerate more rapidly in response to throttle demand. Such designs are complex and hence very costly to manufacture. Secondly, there are designs which alter the volume of the exhaust gas passage in the turbocharger casing thus, influencing the exhaust gas velocity and again enabling the exhaust driven compressor to accelerate more rapidly in response to throttle demand.

Both types of design may be broadly described as variable geometry devices.

Turbochargers are used on both gasoline and diesel oil fueled vehicles. Generally, turbochargers for gasoline engines run at a higher temperature than do turbochargers for diesel oil fueled vehicles. Furthermore, due to the superior fuel efficiency of diesel engines, there is an increasing drive to employ turbocharged diesel engines in mass produced "family" type vehicles. Effectively, such diesel powered vehicles are intended to drive and behave in a manner substantially indistinguishable from gasoline fueled vehicles including the performance thereof.

As noted above, turbochargers in gasoline engines run at a higher temperature than those for diesel engines and furthermore, the general temperature levels for both types are rising as overall engine performance increases.

Unlubricated bearings and components in contact with the exhaust gas for use in turbochargers must be able to survive at 1050° C. without significant oxidation. Consequently, the alloys available for such applications tend to be relatively very expensive cobalt-based or nickel-based alloys made by investment casting or hot isostatic pressing (HIP) full densification with mechanical properties and surface degradation resistance more applicable to high-cost, critical components in aircraft gas turbine engines, for example. Components made by these production processes are very expensive and have performance parameters in excess of that required in, for example, bearings for turbocharger applications.

In the modern types of turbocharger described above, the unlubricated bearing or bush is primarily required to have good oxidation resistance at its operating temperature rather than high creep resistance, as required in rotating parts such as blades for gas turbine engines, for example. Furthermore, internal defects such as relatively high levels of porosity, prior particle boundaries and grain boundary precipitates may be allowable.

It is an object of the present invention to provide a material and method for the processing thereof suitable for use as an unlubricated bearing and/or bush in a turbocharger at an economic production cost.

SUMMARY OF THE INVENTION AND ADVANTAGES

According to a first aspect of the present invention there is provided a sintered material, the material comprising one or more cobalt-based alloys each having a composition in weight %: either Cr 5–30/Mo 0–15/Ni 0–25/W 0–15/C 0–5/Si 0–5/B 0–5/Fe 0–5/Mn 0–5/Total other 10 max/Co balance, from 3–15 weight % of Sn; and optionally from 1–6 weight % of a solid lubricant.

The "total other" elements in the cobalt-based alloy may include Cu, V, Nb, Al and Ta.

The solid lubricant may comprise molybdenum disulphide and/or tungsten disulphide for example.

According to a second aspect of the present invention, there is provided a method of making the sintered material of the first aspect, the method comprising the steps of: mixing together a powder which comprises one or more cobalt-based alloys each having a composition in weight %: Cr 5–30/Mo 0–15/Ni 0–25/W 0–15/C 0–5/Si 0–5/B 0–5/Fe 0–5/Mn 0–5/total others 10 max/Co balance, with from 3–15 weight % of Sn powder and from 1–6 weight % of the material of a solid lubricant powder; compacting said powder mixture to form a green compact; and, sintering said green compact in a controlled environment.

It is preferred that the tin content lies in the range from 4 to 10 weight %.

An unexpected advantage of the tin content is that it acts as a powder pressing aid, acting as a die and powder particle lubricant thus, enabling higher green densities and hence strengths to be achieved at any given pressing pressure.

The solid lubricant may include molybdenum disulphide and/or tungsten disulphide, however, any solid lubricant powder known to be effective at high operating temperatures and able to withstand the sintering step may be employed.

It is preferred that the material and method of the present invention employ a so-called dry lubricating material such as tungsten disulphide or molybdenum disulphide; firstly, because the service applications intended for the materials are in high-temperature environments where conventional oil lubrication is not possible and, secondly because the sulphur content of these materials appears to have a beneficial effect on their production. The tungsten and/or molybdenum disulphide phase partially dissociates at the sintering temperature, and under the ambient conditions of a gas sintering atmosphere at substantially atmospheric pressure, liberating some free sulphur which, in the presence of liquid tin, seems to promote the diffusion of cobalt through the structure as evidenced by SEM EDAX analysis. Tin has been found deep inside prior cobalt alloy particles and substantial amounts of cobalt in the once-liquid phase.

A preferred range of solid lubricant may lie in the range from 2 to 4 weight %.

In order to produce parts from such high cost cobalt-based alloys at a lower cost it is necessary to simplify the processing route and reduce processing time from those normally associated with these types of alloys when used for aerospace applications, for example, to reflect the property requirements of the intended application of the material and method of the present invention. In the material and method of the present invention tin powder is mixed with the cobalt-based powder to provide liquid phase sintering, the tin having the effect of producing a liquid phase at a sintering temperature of 1170° C. and below and also using conventional high-volume production equipment such as continuous throughput conveyor furnaces and the like. Such furnaces may be mesh belt or walking beam furnaces, for example, and utilize flowing protective or reducing gas atmospheres comprising hydrogen and nitrogen mixtures, for example, at substantially atmospheric pressure. Such furnaces generally have a maximum operating temperature capability of about 1200° C. However, batch furnaces using vacuum or gas atmospheres may be used if desired. The liquid phase serves to promote diffusion and consequent densification of the pressed article. The initial liquid tin phase reacts with the cobalt-based or nickel-based alloy and diffuses into the green pressing and is itself eventually absorbed into the solid by reaction therewith so as to produce a rigid skeleton of re-arranged prior particles with a once-liquid phase filling other spaces of the skeleton. Inter-particle-necking between the prior particles is produced. SEM EDAX analysis of sintered material using tin and a cobalt-based powder indicates substantial quantities of cobalt in the once-liquid phase and tin within the prior particles confirming that large scale diffusion between the constituents of the original powder mixture has occurred on sintering.

Liquid phase forms as the tin melts at around 232° C. on heating to the sintering temperature. The liquid tin becomes enriched in cobalt as heating progresses until the final sintering temperature is reached, leaving a volume fraction of liquid proportional to the original mass fraction of tin added. The liquid solidifies eutectically on cooling at around 1112° C.

Normally, when these types of cobalt alloys are used in powder metallurgy (PM) production routes they are usually hot isostatically pressed (HIPped). However, this is a very expensive and time consuming production route and it is preferred for the intended applications of the material and method of the present invention that low-cost, high-volume uniaxial die pressing is employed as the powder compaction technique.

In order to achieve sufficient green strength for the articles to be handleable and survive die-ejection, it is preferred that at least a proportion of the cobalt-based powder be of irregular particle shape. Where all of the powder is of substantially regular shape, such as rounded particles for example, it is not possible to achieve sufficient green strength to permit handling and survive die-ejection.

It is envisaged that more than one pre-alloyed cobalt-based pre-alloyed powder may be mixed together in the same powder mixture prior to compaction and sintering. Additionally or alternatively there may be a proportion of one powder having irregularly shaped particles and a proportion of the same or a different pre-alloyed powder composition having regular shaped powder particles.

Whilst the initial, highly alloyed cobalt-based powders are relatively hard resulting in relatively low as-pressed green densities, sintering produces significant densification due to the liquid phase. Sintering trials have been conducted at 1170° C. and have produced the types of structure described above.

The use of tin in such expensive alloys as nickel-based alloys is something which is generally contrary to the teachings of the prior art. Such alloys are frequently used for extremely arduous applications such as blades, rotors and stators in gas turbine engines, for example. The presence of tin and other low melting point elements in such components is something which is normally specifically excluded or limited to a maximum of about 15 parts per million, for example, on the ground that tin forms relatively low melting point grain boundary phases which seriously weakens highly stressed parts resulting in inter alia lower creep rupture strengths.

Surprisingly, we have found that for the applications intended, i.e. sliding applications such as turbine shaft spindle bushings, actuator bushings, axial sliding bearings and hot-end sealing rings for example, the presence of tin within the sintered material does not present any significant disadvantages in performance, indeed, the presence of tin actually provides improved performance in parts subject to non-lubricated sliding. Furthermore, at the service temperatures envisaged of around 1050° C., the oxidation resistance is entirely adequate notwithstanding the presence of tin. In the types of turbocharger applications intended but, to which are by no means limited, bushings and bearings are frequently located and held in place by the turbocharger casing (often being in a cast iron material which is cast about the bearing or other part) thereby lending considerable mechanical strength thereto.

Whilst it is entirely possible and feasible to use an alloy specifically tailored to a particular service application, it is preferred to use commercially available "off the shelf" cobalt-based alloys to further control production costs. Such alloys are manufactured by companies such as INCO (trade name), Deloro-Stellite (trade name), Metco (trade name) company, Haynes (trade name) and others, for example. Such alloys produced by these companies are used for the applications as described above (HIPped) and also for hard-facing, oxidation resistant uses and applied, for example, by plasma spraying and the like. Examples of such commercially available alloys may include Stellite 31 (trade name), Tribaloy T-400 (trade name) and Metco 45VF-NS (trade name).

Thus, the present invention provides both a material, and a method for the production thereof, able to withstand the intended service environment and able to be produced in high volumes on existing high volume production plant at an economic cost unlike prior art cobalt-based materials.

According to a third aspect of the present invention there is provided a bearing for a turbocharger when made of the material of the first aspect of the present invention.

According to a fourth aspect of the present invention, there is provided a bearing for a turbocharger when made by the method of the second aspect of the present invention.

THE DRAWING

In order that the present invention may be more fully understood, examples will now be described by way of illustration only. The drawing shows a graph of shrinkage vs tin content for examples of materials according to the present invention which also contain varying levels of molybdenum or tungsten disulphide.

DETAILED DESCRIPTION

EXAMPLE 1

Atomised powder of Tribaloy T-400 (trade name) was mixed for 20 minutes in a Y-cone blender with 10 wt % of tin powder and 3.5 wt % of molybdenum disulphide powder.

1.5 wt % of a fugitive die lubricant, Kenolube (trade name), was also added. The blended powder was uniaxially cold pressed at 770 MPa and sintered in a walking beam furnace for approximately 15 minutes at 1170° C. with an atmosphere of 90% nitrogen:10% hydrogen. Visual and SEM-EDAX analysis revealed that original particle boundaries are not visible and particle shape cannot be determined. The microstructure consisted of Co—Mo—Cr particles approximately 12 microns in diameter in a matrix of Co—Mo—Cr—Sn, with a Co—Sn—Mo—Cr phase at particle boundaries having the appearance of solidified liquid. A Cr—S phase was present as a discrete 10 micron sized phase.

EXAMPLE 2

Atomised powder of Metco 45VF-NS (trade name) was mixed for 20 minutes in a Y-cone blender with 5 wt % of tin powder and 2 wt % of molybdenum disulphide powder. 1.5 wt % of Kenolube (trade name) die lubricant was also added. The blended powder was uniaxially cold pressed at 770 MPa and sintered in a walking beam furnace for approximately 15 minutes at 1170° C. with an atmosphere of 90% nitrogen:10% hydrogen. Visual and SEM-EDAX analysis revealed that original particle shape can be determined with particles having the composition Co—Cr—Ni—W—Sn. Inter-particle bonding had taken place the boundaries having 5 micron sized precipitates of Cr—Co—W—Ni—Mo and Cr—S—Sn—Co—Ni, with a Sn—Ni—Co—Cr phase having the appearance of solidified liquid. Within the particles there were 5 micron precipitates of Cr—Co—W—Ni—Mo.

EXAMPLE 3

Atomised powder Stellite 31 (trade name) was mixed for 20 minutes in Y-cone blender with 7.5 wt % of tin powder and 3.5 wt % of molybdenum disulphide powder. 1.5 wt % of Kenolube (trade name) die lubricant was also added. The blended powder was uniaxially cold pressed at 770 MPa and sintered in a walking beam furnace for approximately 15 minutes at 1170° C. with an atmosphere of 90% nitrogen:10% hydrogen. Visual and SEM-EDAX analysis revealed that original particle boundaries were visible due to the formation of precipitates. The particles were composed of Co—Cr—Ni—W—Fe—Sn and the precipitates were a mixture of Cr—S and Cr—W—Co—Mo, with a Sn—Ni—Co—Cr phase having the appearance of solidified liquid.

EXAMPLE 4

Atomised powder Stellite 31 (trade name) was mixed for 20 minutes in Y-cone blender with 7.5 wt % of tin powder and 3.5 wt % of tungsten disulphide powder. 1.5 wt % of Kenolube (trade name) die lubricant was also added. The blended powder was uniaxially cold pressed at 770 MPa and sintered in a walking beam furnace for approximately 15 minutes at 1170° C. with an atmosphere of 90% nitrogen:10% hydrogen. Visual and SEM-EDAX analysis revealed that original particle boundaries were visible due to the formation of precipitates. The particles were composed of Co—Cr—Ni—W—Fe—Sn and the precipitates were a mixture of Cr—S and Cr—W—Co—Mo, with a Sn—Ni—Co—Cr phase having the appearance of solidified liquid.

The composition of the commercially produced alloys referred to above are shown below in Table 1

TABLE 1

| Element | Co | Cr | Mo | Ni | W | C | Si | Fe | Mn |
|---|---|---|---|---|---|---|---|---|---|
| Stellite 31 | Bal | 26 | — | 10.5 | 7.5 | 0.5 | 1 | 2max | 1 |
| Triballoy T400 | Bal | 8 | 28 | 1 | — | 0.1 | 2.4 | 1 | — |
| Metco 45VF-NS | Bal | 25.5 | — | 10.5 | 7.5 | 0.5 | — | — | — |

Shrinkage on sintering, hardness (HRA) and sintered density of Examples 1 to 4 are given below in Table 2.

TABLE 2

|  | % OD Shrinkage | Hardness HRA | Sintered density g/cc |
|---|---|---|---|
| Example 1 | 8.5 | 77 | — |
| Example 2 | 4.6 | 62 | — |
| Example 3 | 5.2 | 64 | 7.9 |
| Example 4 | 5.5 | 65 | 8.1 |

The drawing shows a graph of percentage shrinkage of the overall diameter (OD). There is a quantity of tin powder blended with the respective cobalt alloy powder which, in all cases, is Stellite 31 (trade name). In each of the four traces in the drawing, the Stellite 31 powder has been blended with the appropriate amount of tin powder and also the stipulated amount of molybdenum disulphide or tungsten disulphide according to the legend. In all samples, the Stellite 31 powder was mixed with the appropriate amount of tin and molybdenum-disulphide or tungsten-disulphide, together with 1.5 wt % of Kenolube (trade name), as a die lubricant. All samples were uniaxially die pressed at 770 MPa and sintered at 1170° C. for approximately 15 minutes under an atmosphere of 90% nitrogen:10% hydrogen. It may be seen that there is a surprising result in that with increasing quantities of sulphur carrying solid lubricant material of either molybdenum or tungsten disulphide, the amount of shrinkage increases at any given tin content up to a maximum at about 10 wt % tin. Thus, it is believed that the sulphur liberated from the sulphide compound during the sintering operation assists in the diffusion of tin and other elements throughout the structure and also assists in the resulting densification and consequent reduction of porosity in the structure giving a stronger and more homogeneous material. The sulphur can also promote formation of liquid with Co in a similar fashion to Sn. It is believed that once the tin content reaches about 10 wt %, then the quantity of liquid phase present is sufficient to promote diffusion and densification without the need for the sulphur containing solid lubricant compound in this regard. However, it is believed that the presence of such a solid lubricant compound in the structure assists the bearing sliding characteristics in the application, especially where the presence of a conventional liquid lubricant is not possible.

What is claimed is:

1. A sintered material comprising one or more cobalt-based alloys each having a composition in weight %: Cr 5–30/Mo 0–15/Ni 0–25/W 0–15/C 0–5/Si 0–5/B 0–5 Fe 0–5/Mn 0–5/total others 10 max/Co balance, from 3–15 weight % of Sn, from 1–6 weight % of a solid lubricant material and having a porosity of up to 10 vol %.

2. The sintered material according to claim 1 wherein the solid lubricant is selected from the group consisting essentially of molybdenum disulphide and tungsten disulphide.

3. The sintered material according to claim 1 wherein the tin content lies in the range from 4 to 10 weight %.

4. The sintered material according to claim 1 wherein the solid lubricant content lies in the range from 2 to 4 weight %.

5. The sintered material according to claim 1 wherein the others in the said cobalt-based alloy include one or more of Cu, V, Nb, Al and Ta.

6. A method of making a sintered material having a porosity of up to 10 vol. %, comprising the steps of: mixing together a powder which comprises one or more cobalt-based alloys each having a composition in weight %: Cr 5–30/Mo 0–15/Ni 0–25/W 0–15/C 0–5/Si 0–5/B 0–5 Fe 0–5/Mn 0–5/total others 10 max/Co balance, from 3–15 weight % of the material of Sn powder and with solid lubricant powder providing 1–6 weight % of the material; compacting the powder mixture to form a green compact; and sintering said green compact in a controlled environment.

7. The method according to claim 6 wherein the Sn powder is incorporated in an amount form 4 to 10 weight %.

8. The method according to claim 6 wherein the solid lubricant is selected from the group consisting essentially of tungsten disulphide and molybdenum disulphide.

9. The method according to claim 6 wherein the solid lubricant is incorporated in an amount from 2 to 4 weight %.

10. The method according to claim 6 wherein the green compact is sintered at a temperature of no greater than 1200° C.

11. The method according to claim 6 wherein the sintering temperature is about 1170° C.

12. The method according to claim 6 wherein the material is sintered in a continuous throughput furnace selected form the group consisting essentially of a moving mesh belt furnace and a walking beam furnace.

13. The method according to claim 8 wherein the controlled environment is a gas atmosphere substantially at atmospheric pressure and comprising hydrogen and/or nitrogen.

14. The method according to claim 8 wherein the controlled environment is a vacuum.

15. The method according to claim 8 wherein the powder mixture is compressed by uniaxial die pressing.

16. The method according to claim 8 wherein at least a proportion of the Co-based powder particles are of irregular shape.

17. The method according to claim 8 wherein there are powder particles present in the powder mixture of more than one composition of alloy.

18. A bearing fabricated of a compacted and sintered material, comprising:

one or more cobalt-baaed alloys each having a composition in weight %: Cr 5–30/Mo 0–15/Ni 0–25/W 0–15/C 0–5/Si 0–5/B 0–5/Fe 0–5/total others 10 max/Co balance, from 3–15 weight % of Sn, from 1–6 weight % of a solid lubricant material and having a porosity of up to 10 vol %.

* * * * *